June 17, 1930.  J. C. PRIDGEN  1,764,853
DISTRIBUTING ATTACHMENT FOR HARROWS AND THE LIKE
Filed June 28, 1928  2 Sheets-Sheet 1
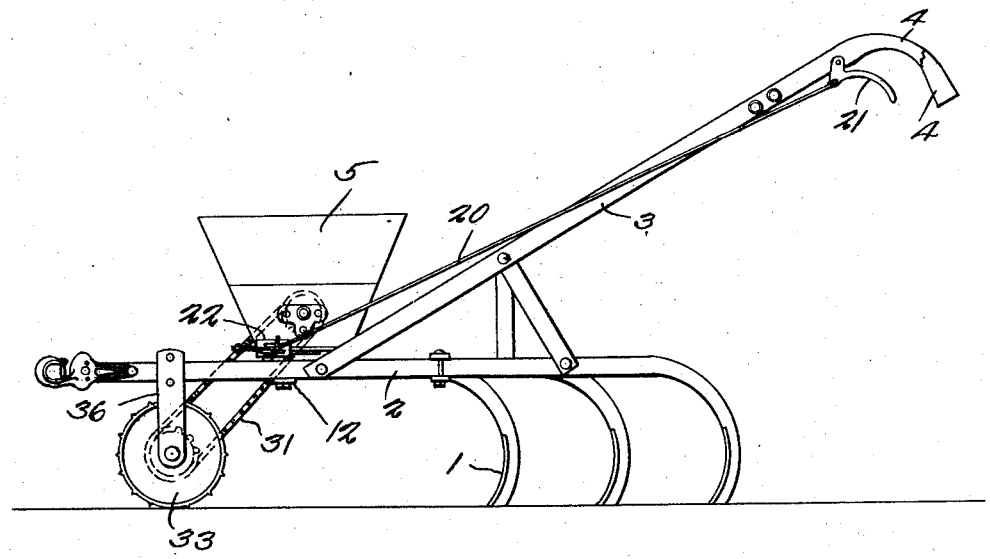
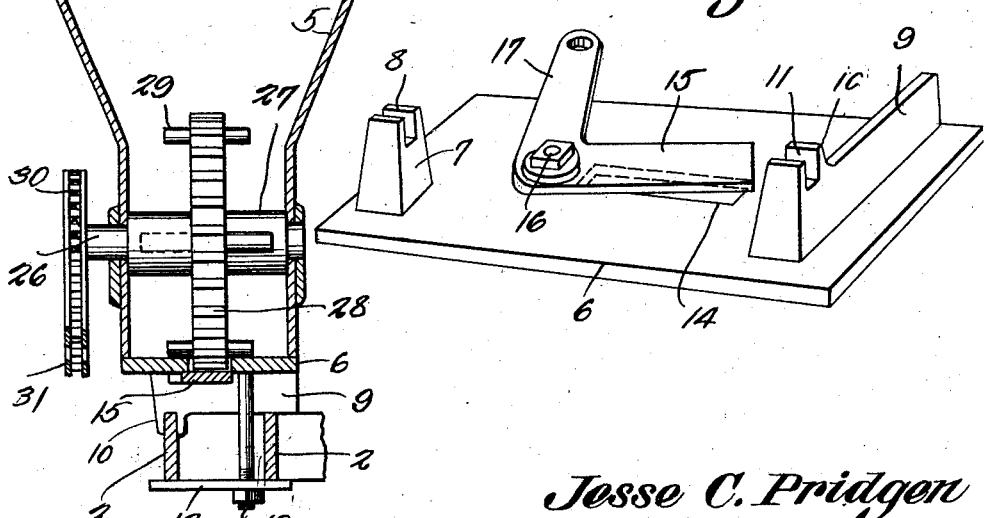
Jesse C. Pridgen
Inventor
By C. A. Snow & Co.
Attorneys.

June 17, 1930.  J. C. PRIDGEN  1,764,853
DISTRIBUTING ATTACHMENT FOR HARROWS AND THE LIKE
Filed June 28, 1928  2 Sheets-Sheet 2
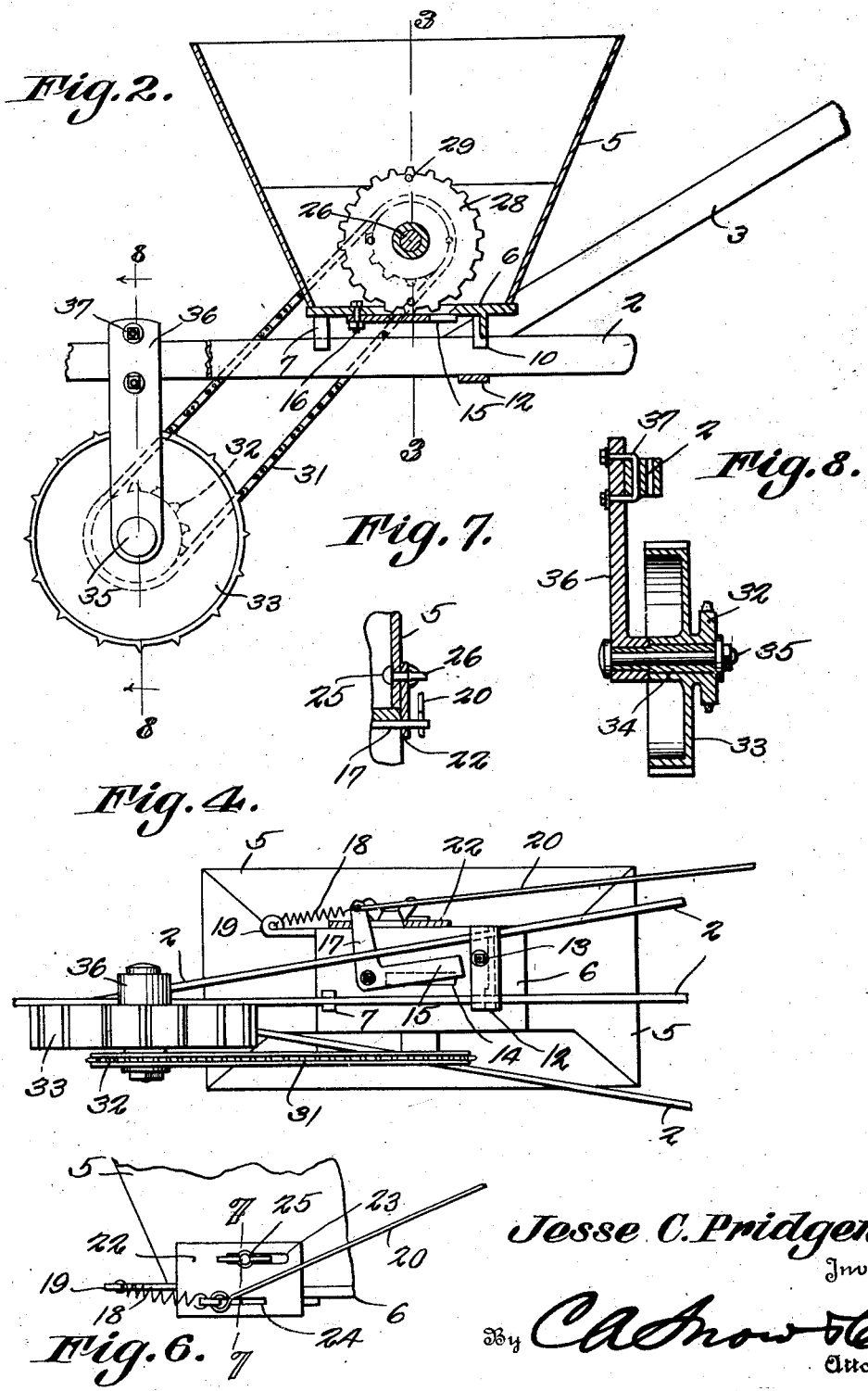
Jesse C. Pridgen
Inventor Patented June 17, 1930

1,764,853

UNITED STATES PATENT OFFICE

JESSE C. PRIDGEN, OF NORLINA, NORTH CAROLINA

DISTRIBUTING ATTACHMENT FOR HARROWS AND THE LIKE

Application filed June 28, 1928. Serial No. 288,873.

This invention relates to an attachment designed for use in connection with harrows, cultivators, etc. whereby nitrate of soda or other top dressing can be applied to the soil while it is being harrowed or cultivated, thereby effecting a considerable saving by eliminating the extra operation usually necessary in order to properly distribute nitrate of soda over the ground.

It is a further object to provide mechanism of this character which will break up the bulk material so that it will not clog the mechanism and will be dropped evenly in desired quantities where it will be covered by the soil engaging teeth or blades of the machine to which the device is attached.

With the foregoing and other objects in view which will appear as the description proceeds the invention resides in the combination and arrangement of parts and in the details of construction hereinafter described and claimed it being understood that changes in the precise embodiment of the invention herein disclosed may be made within the scope of what is claimed without departing from the spirit of the invention.

In the accompanying drawings the preferred form of the invention has been shown.

In said drawings,

Figure 1 is a side elevation of a harrow having the present improvements combined therewith.

Figure 2 is an enlarged vertical longitudinal section through the attachment.

Figure 3 is a section on line 3—3, Figure 2, the agitating wheel and its shaft being shown in elevation.

Figure 4 is a bottom plan view of the hopper showing the adjacent parts, the guide for the gate lever being in section.

Figure 5 is a perspective view of the bottom plate inverted, showing the gate valve and its lever.

Figure 6 is a side elevation of a portion of the hopper showing the adjustable guide plate for the valve.

Figure 7 is a section on line 7—7, Figure 6.

Figure 8 is a section on line 8—8, Figure 2.

Referring to the figures by characters of reference 1 designates a harrow or the like having forwardly converging beams 2 and an upwardly and rearwardly extending handle 3 provided with grips 4.

The attachment constituting the present invention includes a hopper 5 having a bottom plate 6 which, as shown particularly in Figure 5, is provided at one side adjacent the front with a depending lug 7 provided with a recess 8. A transverse web 9, which is integral with the plate, extends downwardly from the plate at its other end and is provided at one side with a depending lug 10 having a recess 11. The recesses 8 and 11 are so located that when the plate is in proper position to support the hopper 5 on the harrow, one of the side beams 2 will rest within the two recesses. The lower edge of the web 9 will rest on other beams of the harrow. A cross plate 12 can be extended under the beams and can be secured to the bottom plate 6 by a bolt 13. Obviously by tightening the bolt the plate 12 can be caused to clamp upon the beams 2 so as to bind them tightly against the lower edge of the web 9 and hold one of them in the recesses 8 and 11.

An outlet slot 14 is formed in the bottom plate 6 at the center thereof and mounted under this slot is a pivoted gate valve 15 held to the plate 6 by a pivot bolt 16. An arm 17 extends from the pivot end of the valve and constitutes a means for actuating the valve. This arm is connected by a spring 18 to a forwardly extending finger 19 on the bottom portion of the hopper and this spring thus serves to hold the valve normally open. An actuating rod 20 extends from the arm 17 to a small hand lever 21 pivoted on one of the handles 3. Thus by pulling lever 21 toward the grips 4 adjacent thereto the valve 15 can be moved to closed position.

A guide plate 22 is mounted on one side of the hopper. This plate has parallel slots 23 and 24. Slot 23 receives a bolt 25 carrying a wing nut 25′ which, when tightened, will hold the guide plate 22 against movement relative to the hopper. The slot 24 has the arm 17 mounted to slide therein. Obviously by adjusting plate 22 longitudinally and then fastening it against further movement, the range of movement of the arm 17 and of the valve 15 can be controlled.

Extending transversely of the hopper 5 is a shaft 26 to which is secured the hub 27 of a pulverizing wheel 28. This wheel is provided with close peripheral teeth and the parts are so positioned that the lower portion of the periphery of the wheel will work within the outlet slot 14 as shown particularly in Figure 3.

Agitating pins 29 are extended laterally from the wheel. Any desired number of these pins may be used and they are adapted to work close to the bottom plate 6 as the wheel rotates. A sprocket 30 is secured to one end of the shaft 26 and is adapted to be driven by a chain 31 extending from a sprocket 32 provided at one side of a ground engaging wheel 33. This wheel is journalled on a bearing sleeve 34 which is held by a bolt 35 to an arm 36 extending downwardly from and bolted to one of the beams 2, as shown at 37.

In practice the plate 22 is first adjusted so as to insure opening of the valve 15 to the proper point. In other words, by adjusting the plate 22 forwardly the arm 17 will be pulled further forward by spring 18 and thus maintain the valve 15 nearer full open position. By adjusting the plate 22 rearwardly, however, the valve 15 can be held so as to reduce the size of the exposed portion of the opening 14. The hopper is partly or entirely filled with the bulk material in the form of nitrate of soda or the like and the harrow or other machine to which the attachment is applied, is then moved forwardly in the usual manner for the purpose of cultivating or harrowing the soil. This movement will cause the wheel 33 to rotate and transmit motion to the shaft 26. Consequently the wheel 28 will be revolved and will pulverize the bulk material adjacent thereto while, at the same time, the pins 29 will agitate the material. The rotating wheel 28 will carry portions of the bulk material in powdered form downwardly to the opening 24 through which it will be discharged on to the ground and subsequently covered by the soil engaging members 1.

Whenever it is desired to stop the delivery of the bulk material, the operator pulls on the lever 21 so as to move the valve 15 to closed position.

When it is not desired to use the attachment it is merely necessary to detach the arm 36 from the beams 2 and to remove the bolt 13 and plate or strip 12 whereupon the entire device can be lifted off of the machine and stored away for future use.

What is claimed is:

1. The combination with an agricultural machine including ground engaging devices and beams extending therefrom, of an attachment including a hopper having an outlet in the bottom thereof, means depending from the bottom of the hopper for engaging the beams to support the hopper, there being recesses in said means for the reception of one of the beams to hold the hopper against lateral displacement, means for clamping the hopper to the beams, and agitating means within the hopper.

2. The combination with an agricultural machine including beams and soil engaging devices, of an attachment including a hopper having a bottom plate provided with an outlet opening, a transverse web integral with and depending from said plate for bearing on the beams, recessed lugs extending from the plate for engaging and straddling one of the beams, means extending under and between the beams for binding the web and lugs upon the beams and holding the hopper fixed relative to said beams and an agitator in the hopper.

In testimony that I claim the foregoing as my own, I have hereto affixed my signature.

JESSE C. PRIDGEN.